US010354555B2

(12) United States Patent
Thaler et al.

(10) Patent No.: US 10,354,555 B2
(45) Date of Patent: Jul. 16, 2019

(54) SYSTEM AND METHOD FOR PERFORMING A HYBRID SIMULATION OF A MEDICAL PROCEDURE

(75) Inventors: Ofer Thaler, Tel-Aviv (IL); Hadar Segal, Bat-Yam (IL); Niv Fisher, Ramat Gan (IL); Shachar Ilan, Sde-Warburg (IL); Matan Shabat, Eilat (IL)

(73) Assignee: SIMBIONIX LTD., Airport City (IL)

( * ) Notice: Subject to any disclaimer, the term of this patent is extended or adjusted under 35 U.S.C. 154(b) by 0 days.

(21) Appl. No.: 13/098,819

(22) Filed: May 2, 2011

(65) Prior Publication Data

US 2012/0282583 A1 Nov. 8, 2012

(51) Int. Cl.
*G09B 23/28* (2006.01)
*G09B 23/30* (2006.01)

(52) U.S. Cl.
CPC .......... *G09B 23/28* (2013.01); *G09B 23/285* (2013.01); *G09B 23/30* (2013.01)

(58) Field of Classification Search
USPC ........................................... 434/267; 703/11
See application file for complete search history.

(56) References Cited

U.S. PATENT DOCUMENTS

| | | | | |
|---|---|---|---|---|
| 3,643,651 A | * | 2/1972 | Cuadros ...................... | 600/591 |
| 5,518,407 A | * | 5/1996 | Greenfield et al. ........... | 434/272 |
| 5,755,577 A | * | 5/1998 | Gillio ............................ | 434/262 |
| 6,074,213 A | * | 6/2000 | Hon .............................. | 434/262 |
| 6,113,395 A | * | 9/2000 | Hon .............................. | 434/262 |
| 6,544,041 B1 | * | 4/2003 | Damadian ..................... | 434/262 |
| 6,773,263 B2 | * | 8/2004 | Nicholls et al. .............. | 434/267 |
| 6,863,536 B1 | * | 3/2005 | Fisher et al. .................. | 434/272 |
| 7,121,832 B2 | * | 10/2006 | Hsieh et al. .................. | 434/262 |
| 7,553,159 B1 | * | 6/2009 | Arnal et al. .................. | 434/267 |
| 7,648,367 B1 | * | 1/2010 | Makower et al. ............ | 434/262 |
| 7,665,995 B2 | * | 2/2010 | Toly .............................. | 434/262 |
| 7,731,500 B2 | * | 6/2010 | Feygin et al. ................ | 434/272 |

(Continued)

FOREIGN PATENT DOCUMENTS

WO  WO 99/42978   8/1999
WO  WO 01/78039   10/2001

(Continued)

OTHER PUBLICATIONS

Rebecca Zitter and Ofer Thaler Simbionix Pr Newswire "Pelvic Mentor" Retrieved from the internet: URL:http://simbionix.com/simulators/pelvic-mentor/ Aug. 2, 2012 pp. 1-2.

(Continued)

*Primary Examiner* — James B Hull
(74) *Attorney, Agent, or Firm* — Pearl Cohen Zedek Latzer Baratz LLP

(57) ABSTRACT

Embodiments of the invention are directed to a method of performing a simulation of a medical procedure. A physical model of an anatomical structure and of a medical tool may be provided. 3D digital models of the anatomical structure and medical tool may be provided. A location parameter related to a location of the physical medical tool with respect to the physical model of the anatomical structure may be received. The 3D models of the anatomical structure and medical tool may be manipulated according to the location parameter.

17 Claims, 7 Drawing Sheets

(56) References Cited

U.S. PATENT DOCUMENTS

| | | | |
|---|---|---|---|
| 8,060,185 B2* | 11/2011 | Hunter et al. | 600/424 |
| 8,152,532 B2* | 4/2012 | Eggert et al. | 434/267 |
| 2005/0032028 A1* | 2/2005 | Chosack et al. | 434/262 |
| 2006/0008786 A1* | 1/2006 | Feygin et al. | 434/262 |
| 2006/0183096 A1* | 8/2006 | Riener et al. | 434/276 |
| 2007/0124128 A1* | 5/2007 | Connacher | G06F 3/016 703/11 |
| 2009/0018808 A1* | 1/2009 | Bronstein et al. | 703/11 |
| 2009/0171143 A1* | 7/2009 | Chu et al. | 600/37 |
| 2009/0177454 A1* | 7/2009 | Bronstein et al. | 703/11 |
| 2009/0317781 A1* | 12/2009 | Oosthuizen | 434/267 |
| 2010/0167250 A1* | 7/2010 | Ryan et al. | 434/267 |
| 2010/0178644 A1* | 7/2010 | Meglan et al. | 434/267 |
| 2010/0261956 A1* | 10/2010 | Townsend et al. | 600/37 |
| 2011/0021869 A1* | 1/2011 | Cholhan | 600/37 |
| 2011/0054416 A1* | 3/2011 | Hollowell et al. | 604/264 |
| 2011/0170752 A1* | 7/2011 | Martin | G09B 23/285 382/128 |
| 2011/0236868 A1* | 9/2011 | Bronstein et al. | 434/267 |
| 2011/0269109 A2* | 11/2011 | Miyazaki | 434/267 |
| 2011/0287398 A1* | 11/2011 | Blackburn | 434/267 |
| 2012/0100517 A1* | 4/2012 | Bowditch et al. | 434/267 |
| 2012/0189998 A1* | 7/2012 | Kruecker et al. | 434/272 |
| 2012/0280988 A1* | 11/2012 | Lampotang et al. | G09B 5/00 |

FOREIGN PATENT DOCUMENTS

| | | |
|---|---|---|
| WO | WO 2009/106784 | 9/2009 |
| WO | WO 2011/046606 | 4/2011 |

OTHER PUBLICATIONS

Rebecca Zitter and Ran Bronstein "Simbionix to Expose Industry First Training Simulator for Pelvic Floor Repair" Pr Newswire. Retrieved from the internet: URL:http://prnewswire.com/news-releases/simbionix-to-expose-industry-first-training-simulator-for-pelvic-floor-repair-120772029.htm. Apr. 27, 2011.

Cagatay Basdogan et al. "VR-Based Simulators for Training in Minimally Invasive Surgery" IEEE Computer Graphics and Applications. Mar./Apr. 2007. pp. 54-66.

Coles et al "The Role of Haptics in Medical Training Simulators: "A Survey of the State of the Art"" IEEE Transactions on Haptics, IEEE, USA. vol. 4, No. 1, pp. 51-66 Jan. 2011.

Rolf Ziegler et al. "Virtual Reality Arthroscopy Training Simulator" Computers in Biology and Medicine. vol. 25. No. 2. pp. 193-203 Mar. 1995.

A. Doi et al. "A Computer-Assisted Internal Examination Training System Using Both Anatomical and Virtual Models" Int. Journal of Design & Nature and Ecodynamics. vol. 5. No. 2. pp. 1-14 Jan. 2010.

Gallagher AG et al., "Novel method for assessment and selection of trainees for higher surgical training in general surgery", ANZ Journal of Surgery, vol. 78, Issue 4, pp. 282-290.

Holubar et al., "Virtual Pelvic Anatomy and Surgery Simulator: An Innovative Tool for Teaching Pelvic Surgical Anatomy", Medicine Meets Virtual Reality 17, IOS Press, pp. 122-124 (2009).

\* cited by examiner

| SINGLE CASE REPORT | | |
|---|---|---|
| SIMBIONIX ADMINISTRATOR  MANNEQUIN MODULE  POSTERIOR MESH PLACEMENT  SESSION 4  14/04/2011  16:47:01 | | |
| METRIC | VALUE | GRAPH |
| ⊖ FINGER ANATOMICAL RECOGNITION | | |
| COVERAGE PERCENTAGE FOR LEFT PORTION OF RECTOVAGINAL SPACE | 100% | |
| COVERAGE PERCENTAGE FOR RIGHT PORTION OF RECTOVAGINAL SPACE | 100% | |
| ⊖ GUIDE | | |
| POSTERIOR LEFT ROUTE ANOMALIES | 1 | |
| MAXIMAL ANOMALY FROM IDEAL POSTERIOR LEFT ROUTE | 38.5mm | |
| POSTERIOR RIGHT ROUTE ANOMALIES | 4 | |
| MAXIMAL ANOMALY FROM IDEAL POSTERIOR RIGHT ROUTE | 49.4mm | |

FIG. 7

SYSTEM AND METHOD FOR PERFORMING A HYBRID SIMULATION OF A MEDICAL PROCEDURE

BACKGROUND OF THE INVENTION

Many medical procedures such as, for example, pelvic floor reconstruction interventional procedures can pose challenges even to the most experienced physicians. When performing a pelvic interventional procedure such as pelvic floor reconstruction, a physician may create a small incision to gain access into the pelvis cavity. Further steps of the procedure usually involve finger anatomical recognition, namely, a finger of the physician serves as the physician's eyes or otherwise replaces senses, and an insertion of a medical device and/or an element, e.g., a cannula and a support grid or mesh. In effect, a physician may be required to perform portions of the procedure without actually seeing the affected organs, medical tools and/or elements used.

Procedures in which visual feedback is limited or unavailable may pose a number of challenges. For example, training a physician in performing such procedures may be extremely complicated and possibly, put a patient in risk. For example, in order to train a physician in performing a pelvic floor reconstruction interventional procedure, a trainer or instructor may physically guide the trainee's hand into the pelvic cavity and instruct and/or help the trainee to feel, identify or recognize the organs and tissues therein. Teaching or training a trainee in a placement of an element such as a support grid may also be done by physically guiding the trainee in performing tasks, e.g., by having both trainer and trainee insert their fingers into the pelvic cavity. Other methods for preparing (e.g., planning access strategy or selecting equipment) or training for invasive procedures in which the visibility of the relevant region or organs is limited may involve using a corpse. However, such methods are lacking since various aspects exhibited by a patient are not exhibited by a corpse. Accordingly, such methods cannot be used for accurately planning, preparing or training for invasive procedures in which visibility of relevant regions, tissues, organs, pathologies or other aspects is limited.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIGS. 3, 4, 5, 6 and 7 show exemplary screenshots related to a simulated procedure according to embodiments of the invention.

Figure 1:
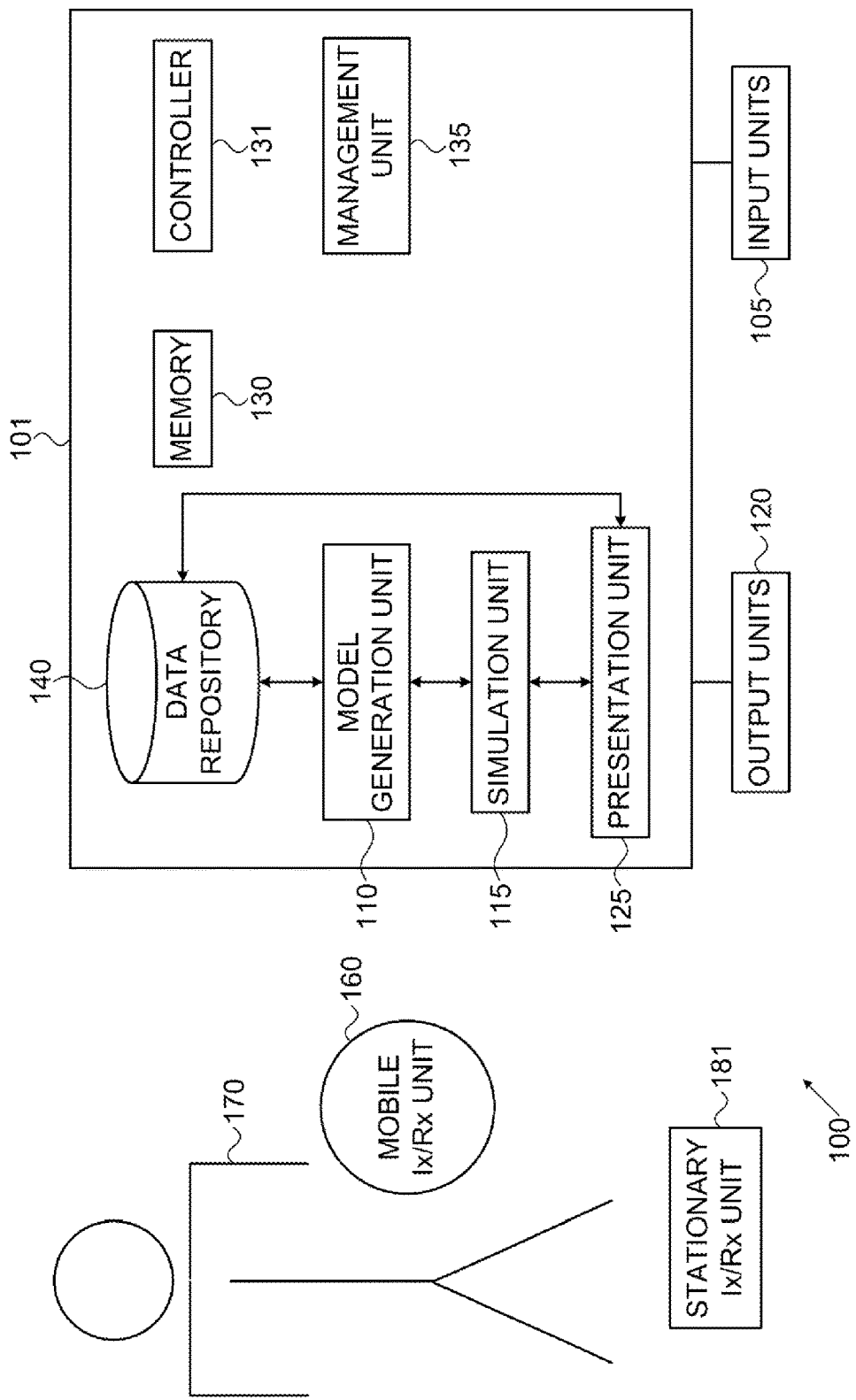
FIG. 1 shows an exemplary system for simulating an invasive medical procedure according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation (s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which shows an exemplary system 100 for a simulation of a medical procedure according to embodiments of the invention. As shown, system 100 may include computing device 101, stationary transmitter/receiver unit 181, a mobile transmitter/receiver unit 160 and a mannequin 170. Device 101 may be any suitable computing device operatively connected to input and/or output (I/O) units. As shown, device 101 may include input units 105, output units 120, a model generation unit 110, a simulation unit 115, a management unit 135, a data repository 140, a presentation unit 125, a memory 130 and a controller 131. Input units 105 may include a mouse, a keyboard, a touch screen or pad or any suitable input devices. Input units 105 may comprise means for receiving input from physical medical tools that may be simulated, e.g., as described herein. For example, physical objects or tools such as handles, activation buttons and the like, as well as real medical tools that may be configured to produce output signals, e.g., signals related to a movement, location, resistance, orientation or force applied, may be connected to one or more input units 105 to enable manipulation of a digital simulation of such physical objects or tools. Input units 105 may include a wired or wireless network interface card (NIC). Specifically, input units 105 may receive input from stationary transmitter/receiver unit 181 and mobile transmitter/receiver unit 160.

A communication management unit (not shown) may utilize a NIC included in output/input units 120/105 to communicate with a database, system or server storing any relevant information or data to obtain any relevant imaging or other information, data or parameters from such a system, server or database and may store obtained data, information or parameters in local data repository 140. Output units 120 may include display screens, components for interfacing with a display screen to enable visual output or optionally a speaker or another audio device to enable audible output. Output units 120 may include one or more displays, speakers and/or any other suitable output devices. Output units 120 may additionally include force feedback components that may apply, cause or generate physical forces or resistance (e.g., friction like resistance) to physical devices that may be operated or manipulated by a user, e.g., to enable force feedback effect. For example, simulation unit 115 may control force feedback enabled devices according to a simulation of a procedure.

Output units 120 and input units 105 may communicate with any other component or units of device 101 and accordingly may enable such units to communicate with external systems. Units 105, 110, 115, 125 and 135 may be or may comprise software, hardware, firmware or any suitable combination thereof. For example, any one of model generation unit 110, simulation unit 115 and/or presentation unit 125, may be implemented as an application-specific integrated circuit (ASIC), e.g., placed on an add-on card that may be installed in computing device 101, or these units may be implemented as a field-programmable gate array (FPGA) module, a chip or any other unit or module, possibly including firmware and specifically designed hardware.

Stationary transmitter/receiver unit 181 and mobile transmitter/receiver unit 160 may transmit and/or receive any information, parameter or signal to/from device 101. Stationary transmitter/receiver unit 181 and mobile transmitter/receiver unit 160 may transmit and/or receive any information, parameter or signal to/from each other, for example, transmitter/receiver unit 181 may receive a signal that may be received by mobile transmitter/receiver unit 160 and mobile transmitter/receiver unit 160 may transmit a signal that may be received by stationary transmitter/receiver unit 181. Stationary transmitter/receiver unit 181 and mobile transmitter/receiver unit 160 may be an ultra low power radio frequency (RF) transmitter with high bandwidth input, possibly provided in chip scale packaging, may be combined with a processing chip or circuit and may transmit and/or receive information via an antenna. Stationary transmitter/receiver unit 181 and mobile transmitter/receiver unit 160 may include a power source such as one or more batteries.

Model generation unit 110 may include components or modules for generating a digital model and its graphical representation, e.g., a 3D anatomical model of an anatomical structure, such as a pelvic cavity or any other anatomical structure, organ or area of interest related to a body of a subject. A digital 3D model may be generated by model generation unit 110 according to information received from any suitable source, e.g., an imaging system, for example, a medical image received from a CT system via input unit 105. In other embodiments, information based on which a digital model may be generated may be received, e.g., from a manufacturer or provider of a dummy or mannequin, e.g., mannequin 170. It will be recognized that embodiments of the invention are not limited by the method or system for generating a digital 3D model of an anatomical structure, any methods or systems may be used for generating such model without departing from the scope of the invention.

Simulation unit 115 may include components for generating a simulation of an invasive medical procedure. For example, when a user performs a simulation, for example as a pre-procedure for an invasive medical procedure, using simulation unit 115, a graphical representation of a digital model (e.g., produced by model generation unit 110), and the simulation process may be displayed on a monitor that may be one of output units 120. A generation of a digital model of an anatomical organ, system, section or region (e.g., by model generation unit 110) and a simulation of a procedure (e.g., by simulation unit 115) may be according to methods, systems and/or other aspects as described in US Patent Application Publication US 2009/0177454. As further described herein, a simulated invasive medical procedure may include performing operations on mannequin 170 and manipulating a digital model according to operations performed on mannequin 170. Manipulation of a digital model may be based on signals transmitted by stationary transmitter/receiver unit 181, received by mobile transmitter/receiver unit 160 and provided to a controller, e.g., controller 131 that may process received signals, determine a location of mobile transmitter/receiver unit 160 and update, in real-time, one or more 3D digital models based on the location of mobile transmitter/receiver unit 160. In some embodiments, determining a location of a physicians hand, a medical tool or an element may be accomplished using one or more stationary devices without using any mobile transmitter or receiver. For example, a device configured to project light (that may be invisible) or other forms of energy and further configured to detect reflected light or other energy from objects in space may be used. For example, infrared (IR) light or other form of electromagnetic radiation may be emitted by a device located near mannequin 170. IR light emitted may be returned (e.g., reflected) by a medical tool, a physicians hand or other objects. Reflected IR light may be received by the emitting or other device and, based on properties of reflected light, the location, orientation or other aspects of a medical tool or any other object may be determined. It will be understood that embodiments of the invention are not limited by the system or method used for determining a location, position or orientation of objects in a space near mannequin 170.

Controller 131 may be any suitable controller or processing unit, e.g., a central processing unit processor (CPU). Memory 130 may be any suitable memory component, device, chip or system and may store applications or other executable codes that may be executed by controller 131 and/or data, e.g., data that may be used by applications or programs executed by controller 131. For example, executable code, applications or modules implementing model generation unit 110 and/or simulation unit 115 may be loaded into memory 130 and executed by controller 131.

It will be recognized that device 101 as described herein is an exemplary system. According to embodiments of the invention, device 101 may be implemented on a single computational device or alternatively, in a distributed configuration, on two or more different computational devices. For example, model generation unit 110 may operate on a first computational device and managed by a first management unit whereas simulation unit 115 may operate on another computational device and managed by a second management unit that communicates with the first management unit. In another exemplary embodiment, management unit 135 may operate on a computational device, model generation unit 110 may operate on a second computational device and simulation unit 115 may operate on a third computational device.

Presentation unit 125 may control, coordinate or manage a display or presentation of video, audio or other aspects of a simulated procedure. For example, presentation unit 125 may receive data, parameters or other information from a plurality of sources and incorporate received or obtained data into a presentation to a user. Presentation unit 125 may coordinate, synchronize or otherwise relate a presentation of information from a plurality of sources within a single presentation. For example, in a single presentation, presentation unit 125 may use information and/or signals received from simulation unit 115, from stationary transmitter/receiver unit 181 and from mobile transmitter/receiver unit 160. Management unit 135 may interact with any module, unit, application or other applicable entity and may perform coordination, scheduling, arbitration, supervising and/or management of flows, procedures or other aspects as described herein.

Data repository 140 may be any component capable of storing digital information. Data repository 140 may include or may be, for example, a hard disk drive, a floppy disk drive, a Compact Disk (CD) drive, a CD-Recordable (CD-R) drive, or other suitable removable and/or fixed storage unit. Data repository 140 may include or may be a USB storage device or a FLASH storage device. Although shown as included in device 101, in some embodiments, data repository 140 may be an external device, component or system, e.g., a network storage device or system operatively connected to device 101. It will be recognized that the scope of the present invention is not limited or otherwise affected by the type, nature, operational and/or design aspects of data repository 140. For example, data repository 140 may comprise any suitable number of possibly different storage devices without departing from the scope of the present invention. Any information, data or parameters required by device 101 in order to perform, or participate in a simulation of an invasive procedure may be stored in data repository 140. For example, management unit 135 may interact, e.g., over a network and possibly according to and/or by implementing a predefined protocol, with any external data repository and may be thus received any relevant information, e.g., provided by a manufacturer of mannequin 170 or a manufacturer or provider of simulation medical tools and may stored received in data repository 140.

Mannequin 170 may be any object representing a patient or subject. For example, mannequin 170 may be a life-size partial or full representation of a human body, e.g., a doll or other model made of plastic or any other suitable matter or substance. Mannequin 170 may include physical models of internal parts or organs, e.g., a pelvic basin, blood vessels, bones and the like. Generally, any part or organ of a patient that may be relevant to a simulation of a procedure may be included in mannequin 170. Mannequin 170 may be stationary. For example, mannequin 170 may be firmly secured to a table or support tray such that it can not be moved. In some embodiments, although mannequin 170 may stationary, some parts, e.g., a limb, internal parts or head may be moved, e.g., in order to closely simulate a real patient.

Mannequin 170 may be positioned in any way suitable for the simulated operation or procedure. For example, mannequin 170 may be placed or positioned on its back or it may be made to sit or assume any applicable position. A digital model of mannequin 170 may be updated or configured according to the position assumed by mannequin 170 may be. For example, a digital model may be made to assume any position assumed by mannequin 170. Mannequin 170 may include replaceable parts. Accordingly, mannequin 170 may be used in order to simulate various patients, conditions, pathologies or any applicable aspects of a simulated patient. For example, various parts (that may be external or internal) may be changed, replaced or modified based on a gender of a simulated patient, a medical condition or a pathology. A digital model of mannequin 170 may be updated or configured according to any parts or attributes of mannequin 170. For example, the digital model representing mannequin 170, a part of mannequin 170 or any other physical model of an anatomical structure may be updated according to any part included in mannequin 170 or a physical model of an anatomical structure. For example, one of a number of physical model of internal organs may be fitted in mannequin 170 (e.g., a bone structure or any internal organ). A digital model representing mannequin 170 and the specific parts fitted or installed in mannequin 170 may be used.

Stationary transmitter/receiver unit 181 may be firmly secured to a table or support tray such that it can not be moved. The location and/or orientation of stationary transmitter/receiver unit 181 may be known and/or recorded. For example, the distance of stationary transmitter/receiver unit 181 from mannequin 170 (or a specific part of mannequin 170) may be known. Location position and/or orientation of stationary transmitter/receiver unit 181 may be recorded, e.g., stored in data repository 140 and/or loaded into memory 130. Generally, any information or parameter related to a location, position or orientation of stationary transmitter/receiver unit 181 and of mannequin 170 may be known and recorded. Accordingly, the location, position and/or orientation of stationary transmitter/receiver unit 181 with respect or relevant to a location and/or orientation of mannequin 170 (which, as described herein, may be stationary and its location and/or orientation may be known and/or recorded) may be known and/or recorded. As described herein, using information or data related to a location, position and/or orientation of stationary transmitter/receiver unit 181 and of mannequin 170 and by determining a location, position and/or orientation of a transmitter (e.g., by analyzing a signal transmitted by the transmitter and received by stationary transmitter/receiver unit 181, the location, position and/or orientation of the transmitter with respect to mannequin 170 may be determined.

A signal transmitted by mobile transmitter/receiver unit 160 may be received by stationary transmitter/receiver unit 181. A signal transmitted by stationary transmitter/receiver unit 181 may be received by mobile transmitter/receiver unit 160. In some embodiments, based on processing signals transmitted by mobile transmitter/receiver unit 160 and received by stationary transmitter/receiver unit 181, the location of mobile transmitter/receiver unit 160 may be determined. For example, the electro-magnetic field created by a signal transmitted by mobile transmitter/receiver unit 160 may be known. For example, parameters or coefficients such as amplitude, attenuation, frequency and the like may all be known (e.g., based on specification provided by a manufacturer of a transmitter/receiver unit). Similarly, an electro-magnetic field created by a signal transmitted by stationary transmitter/receiver unit 181 may be known and a signal received by mobile transmitter/receiver unit 160 may be may be analyzed and/or processed to determine the location of mobile transmitter/receiver unit 160.

Moreover, one or more signals transmitted by mobile transmitter/receiver unit 160 may not be homogeneous or constant in space or direction. For example, mobile transmitter/receiver unit 160 may transmit a first electromagnetic signal in a first direction, e.g., along the X axis in a given coordinate system, and another signal in a second direction, e.g., along a Y axis in the same coordinate system. Accordingly, by analyzing a signal received from mobile transmitter/receiver unit 160 by stationary transmitter/receiver unit 181, the location and orientation of mobile transmitter/receiver unit 160 may be determined, monitored and/or tracked. For example, stationary transmitter/receiver unit 181 may include a 3-axis orientation sensor capable of measuring yaw, pitch, and roll based on a magnetic field. Accordingly, based on a known magnetic field induced by mobile transmitter/receiver unit 160, the location, position and/or orientation of mobile transmitter/receiver unit 160 may be determined. The distance and/or location of stationary transmitter/receiver unit 181 with respect to mannequin 170 may be known, accordingly, the location, position and/or orientation of mobile transmitter/receiver unit 160 with respect to mannequin 170 may be determined.

In some embodiments, components or systems that may be commercially available may be used. Any system that provides or enables elements such as dynamic and/or real-time measurements of position (e.g., X, Y and Z Cartesian coordinates) and/or orientation (e.g., azimuth, elevation and roll) may be used. For example, products available from Polhemus® and/or NDI® may be used to track a medical tool, finger or element used in performing a simulated procedure. Using tracking information provided by a tracking system and a location, position, orientation or other spatial parameters of a dummy or doll (e.g., mannequin 170), digital models of one or more of a tool, finger or element and a digital model of the dummy or doll may be manipulated (and displayed), in real-time, such that the digital models adequately and closely represent one or more of the tool, finger, element and doll. Accordingly, a user performing a simulated procedure (e.g., inserting an element such as a support mesh into mannequin 170) may be provided with a comprehensive view, from any desired angle and of any desired section of the dummy or doll used as well as of the other elements, e.g., a tool, finger or element.

In some embodiments, a plurality of stationary transmitter/receiver units that may be similar to transmitter/receiver unit 181 may be used. Each of such plurality of stationary transmitter/receiver units may transmit a specific signal, e.g., a signal having a specific frequency, amplitude or other known characteristics. Accordingly, a plurality of different signals may be received by transmitter/receiver unit 160. Transmitter/receiver unit 160 may communicate any parameters related to received signals to controller 131 that may calculate, based on parameters received from transmitter/receiver unit 160, the location of transmitter/receiver unit 160. For example, by analyzing the strength of signals received by transmitter/receiver unit 160 from each of a plurality of stationary transmitter/receiver units, the distances of transmitter/receiver unit 160 from the stationary transmitter/receiver units may be calculated.

Using the calculated distances and the known locations, arrangement or placement of the stationary transmitter/receiver units, the location of transmitter/receiver unit 160 may be determined by controller 131. For example, using known coordinates of the stationary transmitter/receiver units and known attributes of signals transmitted by the stationary units, the distances of mobile transmitter/receiver unit 160 from the stationary transmitter/receiver units may be calculated. Based on a number of distances from a respective number of known coordinates, the location of mobile transmitter/receiver unit 160 may be determined. The distances and/or locations of the of the stationary units with respect to mannequin 170 may be known, accordingly, the location of mobile transmitter/receiver unit 160 with respect to mannequin 170 may be determined.

Embodiments of the invention may be applicable to various medical procedures. In particular, embodiments of the invention may be applicable to anterior and/or posterior repair procedures that may be performed in order to treat pelvic organ prolapse. Although the description herein will mainly relate to a pelvic floor reconstruction interventional procedure, it will be understood that embodiments of the invention may be applicable to various other procedures. For example, embodiments of the invention may be applicable to pregnancy tests or procedures related to treating or diagnosing the cervix. Generally, pelvic organ prolapse (POP) occurs when a pelvic organ (e.g. bladder) drops (prolapses) from its normal location in the lower pelvis and pushes against the walls of the vagina. For example, as a result of stretched and weaken muscles. Patients suffering from strain during childbirth, long-lasting cough or pelvic organ tumors may be associated with high risk factors of POP. Known related conditions or pathologies may be, for example, apical vaginal prolapsed (enterocele), anterior vaginal wall prolapsed (cystocele) and posterior vaginal wall prolapsed (rectocele).

A pelvic floor reconstruction interventional procedure (e.g., anterior or posterior repair procedure) may include inserting an element, e.g., an element that may be used as mechanical support or bridging material for the fascial defect. For example, an element may be the GYNECARE GYNEMESH® PS mesh that may be used for tissue reinforcement and stabilization of fascial structures of the pelvic floor in cases of vaginal wall prolapse. In performing a pelvic floor reconstruction interventional procedure, a physician may insert his or her finger in order to develop or create a Paravaginal and/or Rectovaginal space. The procedure may further include a palpation of the relevant landmarks, an insertion of a guide and finding (by feeling), a suitable location for placing an element (e.g., a support mesh). A cannula may then be inserted (from a different direction) such that it reaches the location where the physician's finger is located. A guide may be inserted in order to guide the cannula to position. The guide may be removed leaving the cannula in place. A mesh may then be connected to the retrieval wire and pulled into its location by pulling the wires.

Accordingly, a pelvic floor reconstruction interventional procedure may be an example of procedure in which deviating from a path or missing a location may put a patient in risk as sensitive organs and tissues may be damaged. Exemplary damages may be a perforation of the bladder, nerve injury, rectal bowel, bleeding as a result of blood vessel perforation, etc. However and as discussed above, current methods do not enable a physician to adequately train for such procedure. As described herein, embodiments of the invention may enable training for such interventional procedure by providing 3D models of an anatomy, a hand, a medical tool and/or an element and further manipulating, in real-time, the models according to operations and/or movements of a trainee. Indications, warnings, alerts and guidance may all be provided, in real-time, during a simulated procedure.

According to embodiments of the invention, a simulated procedure may comprise a graphical representation of an anatomical model (e.g., a 3D digital model) that may be displayed on a monitor with additional information, such 3D digital models of tools, fingers and/or elements. In some embodiments, a 3D digital model of an anatomical structure or organ and of the tools, fingers and/or elements may exhibit real anatomical or physical qualities, traits, features, nature or aspects, e.g., move, bend, contract, react to pressure or medicine, bleed, etc. A simulation of a medical procedure may comprise an image or graphical representation of an anatomical organ, e.g., a model as described herein, that may be rotated or otherwise positioned, or may be made to imitate a real anatomical system, e.g., change or evolve with time, change shape in response to an operation of, or an interaction with a medical tool or substance, bleed, or otherwise present or display real anatomical organ's behavior and related tools, medicine or other aspects. For example, a grid, mesh, catheter, stent, cannula, guide, syringe, needle or other tools, devices or elements may all be shown and further simulated by a 3D digital model. Accordingly, a physician may perform a simulation of a medical procedure as a pre-procedure of the actual surgery (e.g., a surgical rehearsal or surgical simulation), as part of a planning procedure, as a training session or as a post-procedure.

Figure 2:
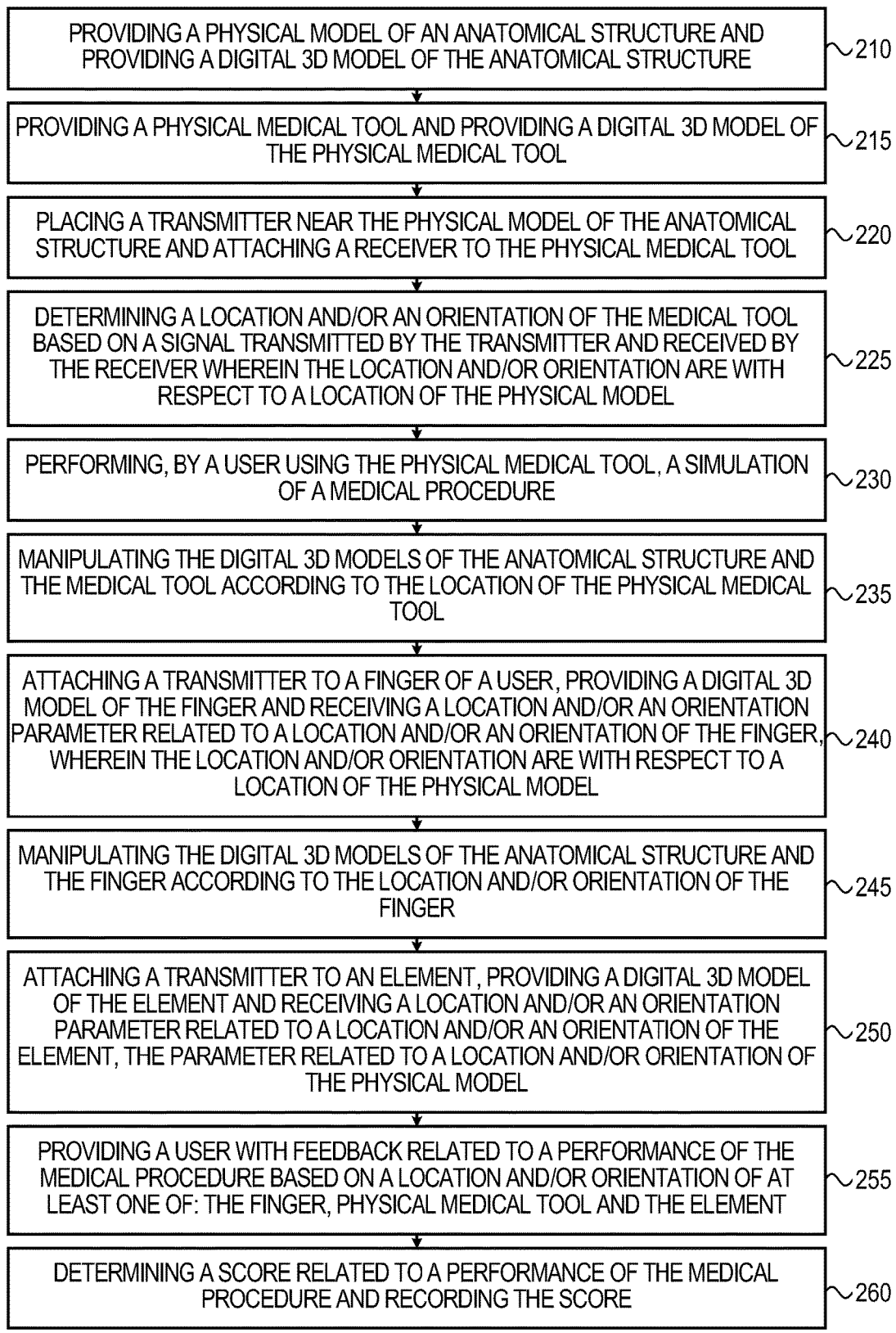
FIG. 2 is a flowchart diagram illustrating a method for concurrently simulating an image-guided procedure and presenting medical image data according to some embodiments of the present invention.

Reference is made to FIG. 2, which shows an exemplary flowchart describing a method for simulating a medical procedure according to some embodiments of the invention. It will be understood that some of the described elements in the flow may occur or be performed simultaneously, at the same point in time, or concurrently. In some embodiments, some of the elements shown in FIG. 2 may be omitted, in other embodiments, the order of operations shown in FIG. 2 may be altered. As shown by block 210, the method may include providing a physical model of an anatomical structure and providing a digital 3D model of the anatomical structure. For example, mannequin 170 may be provided and a digital 3D model generated by model generation unit 110. In other embodiments, a digital 3D model may be provided by a manufacturer of mannequin 170.

Figure 3:
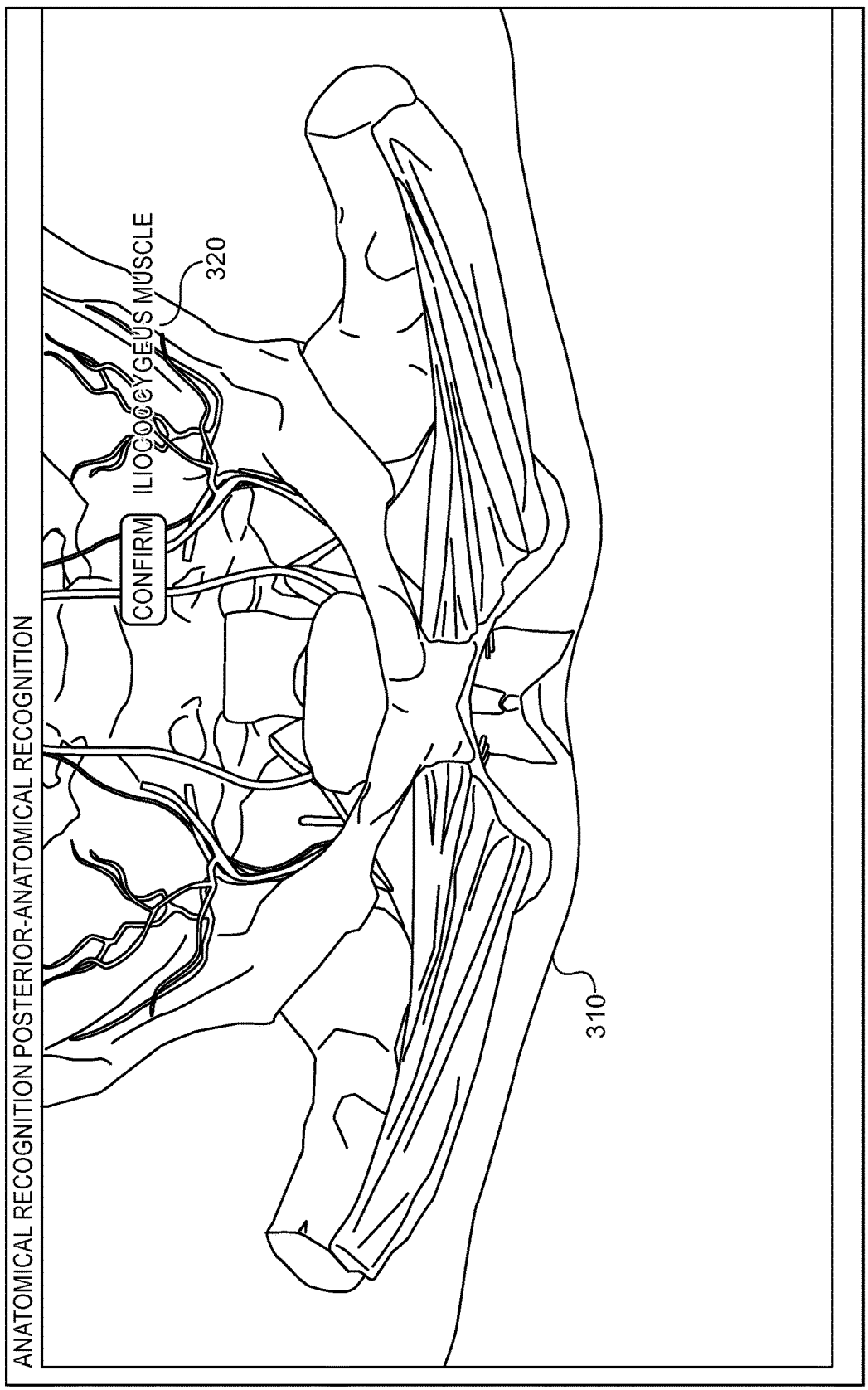

Reference is additionally made to FIG. 3 which shows an exemplary screenshot including a simulated, 3D digital model according to embodiments of the invention. As shown by 310, a simulated, 3D digital model may include any portion, organ or anatomical structure or system, e.g., bones, blood vessels, muscles and the like. A digital model may be used in a number of ways. For example, the digital model may be used to closely mimic a simulated procedure performed on a dummy In other embodiments, a simulated, 3D digital model may be used in a number of training methods. For example, in order to teach or train a physician in recognizing (e.g., by feel only) internal parts, the trainee may be instructed to touch a specific organ and a system may provide an indication of whether or not the organ was indeed touched. For example, a user may be instructed to touch a specific muscle in a dummy, the user may touch the muscle in the dummy (e.g., in mannequin 170) and an indication of the actually touched muscle may be provided as shown by 320. Similarly, a user may be trained to reach specific areas within a dummy and may be provided with an indication of whether or not the area was reached.

As shown by block 215, the method may include providing a physical medical tool and providing a digital 3D model of the physical medical tool. For example, a cannula may be placed on a guide, thus, by tracking the guide (e.g., based on a sequence of determined locations), the location of the cannula may be tracked or determined. A cannula or guide may be used in a placement of a mesh in a pelvic floor reconstruction interventional procedure and may be provided and used by a trainee in a simulated procedure. For example, a provided physical medical tool and mannequin 170 may be used, by a trainee, to simulate a medical procedure. A digital 3D model of a medical tool may be generated by model generation unit 110 that may be provided with any required information. For example, model generation unit 110 may be provided with dimensions of a medical tool and/or other aspects, e.g., an elasticity, and may generate a 3D digital model of the tool. As shown by block 220, the method may include placing a transmitter near the physical model of the anatomical structure and attaching a receiver to the physical medical tool. For example, stationary transmitter/receiver unit 181 may be placed near mannequin 170 and mobile transmitter/receiver unit 160 may be attached to a medical tool provided as described with respect to block 215. As described herein, the flow may include determining a location of the medical tool (or a finger or hand of a physician). In some embodiments, instead of or in addition to placing a stationary transmitter at a known location with respect to a mannequin and attaching a mobile receiver to a medical tool, hand or finger, a stationary receiver may be used, e.g., in conjunction with a mobile transmitter. In such embodiments, the mobile transmitter may transmit one or more signals that may be picked up or received by one or more stationary receivers.

The receivers may transmit signals received from the mobile transmitter to a controller that may determine the location of the mobile transmitter based on one or more signals received by the stationary receivers. For example, provided with information such as the location of the one or more receivers, and any relevant attribute or parameter related to the signals transmitted by the mobile transmitter that may be attached to the medical tool or finger (e.g., distribution of the signal in space, amplitude, attenuation, frequency and the like), a controller (e.g., controller 131) may determine a location and/or orientation of the medical tool, finger or any object to which a mobile transmitter is attached to. In some embodiments, to determine an orientation, two or more transmitters or receivers may be attached to a medical tool or finger. For example, by attaching two transmitters to a medical tool (that may each transmit a different signal) the location of the two transmitters may be determined Using the locations of the two transmitters and knowing how such two transmitters are attached to a medical tool, finger or other object, the exact orientation in space of the tool, finger or other object may be determined. It will accordingly be understood that any arrangement of any number of stationary and/or mobile transmitters and/or receivers may be used to enable a controller to determine a location and/or orientation of a medical tool, finger of a user or any other object.

As shown by block 225, the method may include determining a location and/or an orientation of the medical tool based on a signal transmitted by the transmitter and received by the receiver wherein the location and/or orientation are with respect to a location, position, orientation or other aspect of the physical model. For example, a location of a medical tool may be determined by determining, e.g., as described herein, a location and/or orientation of a transmitter that may be attached to the medical tool. By using one or more parameters related to a location of a mannequin, the location of the medical tool with respect to the mannequin may be computed and/or determined. The orientation of the mannequin may be known, e.g., stored in data repository 140 and/or loaded into memory 130, thus, for example, any parameter related to a location and/or orientation of mannequin 170 may be available to controller 131. Accordingly, using known location and/or orientation of a medical tool and of a mannequin, 3D models of the medical tool and the mannequin may be presented, e.g., displayed on a display attached to a computing device, where the models are displayed such that the respective or relevant locations and orientations of the 3D models are according to the locations and orientations of the physical medical tool and mannequin.

Figure 4:
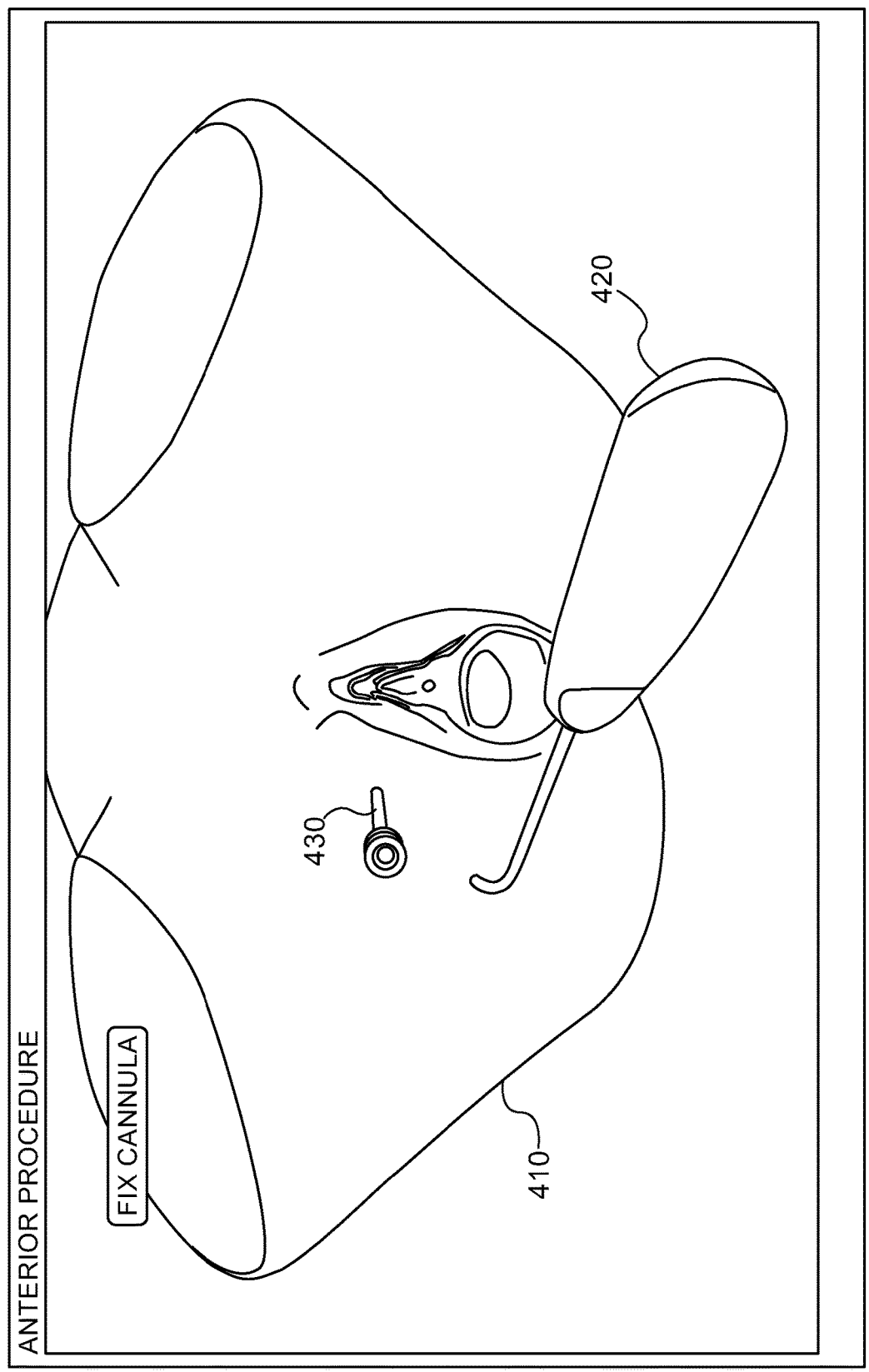

Reference is additionally made to FIG. 4 which shows an exemplary screenshot including simulated, 3D digital models of an anatomical structure, a tool and an element according to embodiments of the invention. By determining a location and/or an orientation of the medical tool and/or an element wherein the location and/or orientation are with respect to a location, position, orientation or other aspect of the physical model, embodiments of the invention may adequately present a model of the physical model (e.g., mannequin 170) and a model of a medical tool and/or element (and/or a finger or other object) such that the respective locations and orientations of the digital models are the same as the locations and orientations of the actual (physical) entities. For example, the locations, positions and orientations of tool 420 and element 430 with respect to model 410 may be substantially the same as the locations, positions and orientations of an actual, physical tool and/or element with respect to a physical model of a human subject (e.g., mannequin 170).

As shown by block 230, the method may include performing, by a user using the physical medical tool, a simulation of a medical procedure. For example, a simulation of a pelvic floor reconstruction interventional procedure may be performed by a user using the medical tool and mannequin 170. As shown by block 235, the method may include manipulating the digital 3D models of the anatomical structure and the medical tool according to the location of the physical medical tool. For example, simulation unit 115 may manipulate the 3D digital models of the anatomical structure and the medical tool according to a location and/or orientation of the medical tool and according to any attributes of the 3D digital models. For example, a 3D digital model of an anatomical structure may be caused to imitate a reaction of an anatomical structure to an intervention of the medical tool (e.g., bend, stretch, bleed etc.).

For example, a 3D model of a medical tool may be moved, rotated or made to change its shape based on a location, position or orientation of a related physical tool. A 3D model of a mannequin may be manipulated based on a location, position or orientation of a medical tool. For example, a modeled tissue or organ included in a 3D digital model of a mannequin may be made to bend, stretch or otherwise change shape, location or orientation based on a position, location or orientation of a medical tool, for example, in order to simulate an interaction of a medical tool with a mannequin. Accordingly, the 3D models of a medical tool and mannequin may be manipulated such that they closely duplicate, imitate, replicate, repeat, copy or reproduce any movement or other aspect of the physical medical tool and mannequin. The 3D model of the mannequin may be manipulated such that it imitates or reproduces the response or interaction of a real subject, patient or physical mannequin with the medical tool.

Figure 5:
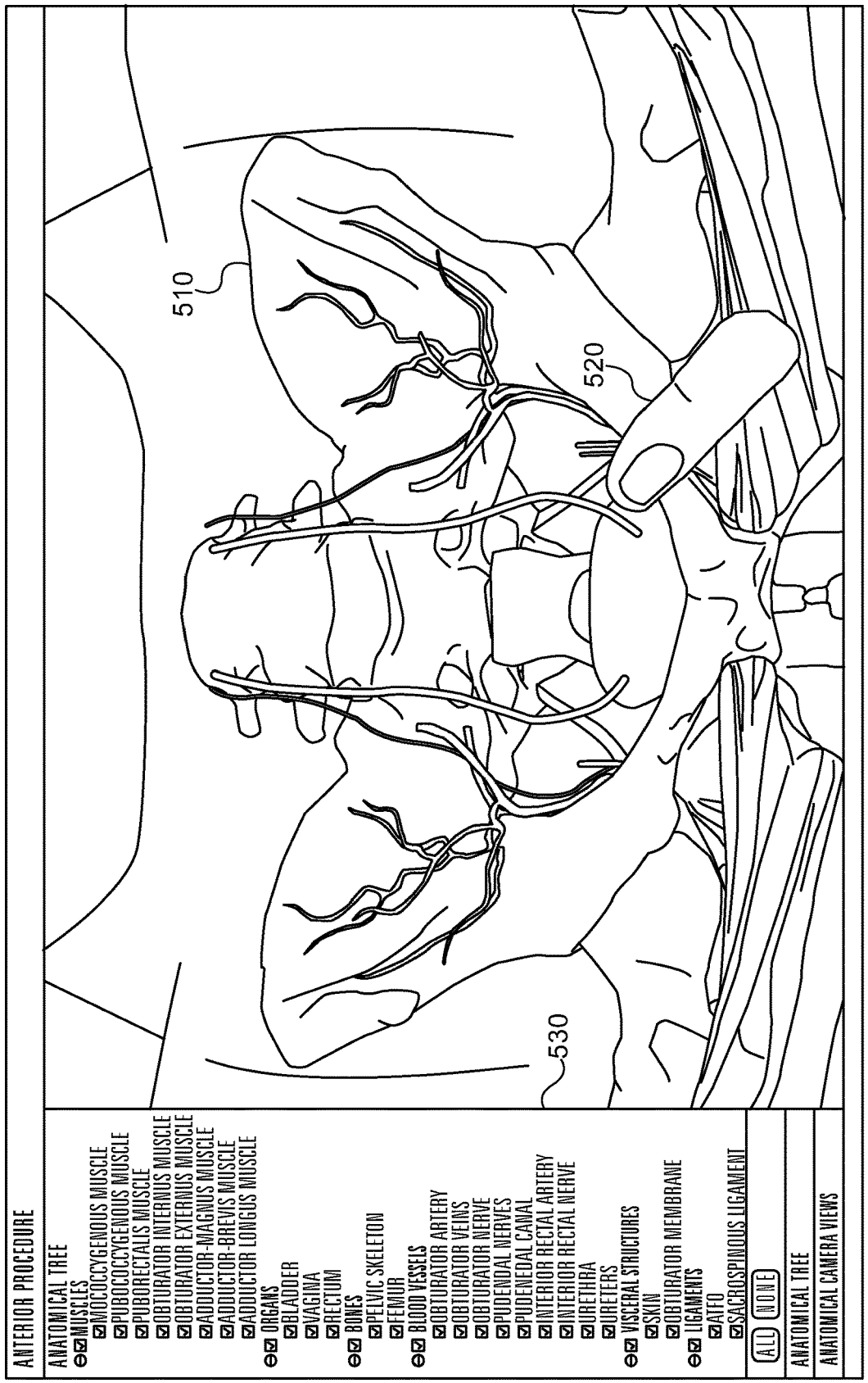

As shown by block 240, the method may include attaching a transmitter to a finger of a user, providing a digital 3D model of the finger and receiving a location and/or an orientation parameter related to a location and/or an orientation of the finger, wherein the location and/or orientation are with respect to a location, position, orientation or other aspect of the physical model. For example, one or more transmitter units (e.g., units similar to mobile transmitter/receiver unit 160) may be attached to a physician's finger or hand, a 3D digital model of the hand or finger may be displayed on a computer screen and may further be manipulated according to a movement of the finger of hand. For example, the location and/or orientation of the finger may be determined based on the location and/or orientation of the attached transmitter as described herein. Reference is additionally made to FIG. 5 which shows an exemplary screenshot including simulated, 3D digital models of an anatomical structure and of a finger, using a location parameter related to a location, orientation or position of a finger with respect to a location of a physical model, a simulated digital model of a finger as shown by 520 may be displayed, with respect to a simulated digital model of an anatomical system as shown by 510 where the two models are displayed such that their respective locations, positions or orientations are substantially the same as those of a related actual finger of a user and of an actual, physical model.

As shown by 530, a display may be divided into a number of regions. For example, model 510 and finger 520 may be displayed in a first region and an anatomical tree 530 may be displayed in a second region. In one embodiment, an anatomical tree may include check boxes that may be used to include selected elements or attributes in a digital model or exclude such elements or attributes. For example a user may select to only show a specific muscle (e.g., while hiding or obscuring any other anatomical parts or information by a digital model of the skin tissue). Accordingly, a training level may be set, for example, more and more anatomical regions or organs may be omitted from a digital model in order to increase skill and/or better provide real life experience. In some embodiments, an anatomical tree may include families or groups of selectable elements. For example, elements such as bone structures and blood vessels may be selected based on a selection or indication of an age of the simulated patient, a gender, or other aspects. For example, a first set may be automatically selected for a young male and a second set may be selected for an elderly female. Pathologies may be selected, e.g., low blood pressure, muscles related pathologies etc. In some embodiments, physical parts modeling a pathology, a gender, an age or other aspects of a simulated patient may be installed in a mannequin. A 3D digital model may be automatically synchronized with a set of physical parts modeling an aspect of a patient, e.g., the set of removable or replaceable elements included or installed in mannequin 170. For example, mobile transmitter/receiver unit 160 may receive a signal or information (e.g., an identification code) from a passive or active component installed in a replaceable physical parts installed in mannequin 170, transmit the identification code to controller 131 (e.g., to management unit 135) that may instruct model generation 110 to generate a model according to specific parameters selected based on an identification code. Likewise, different mannequins (e.g., a set modeling a child, an adult and a baby) may be automatically identified and a preconfigured 3D digital model may be selected based on the identification.

Figure 6:
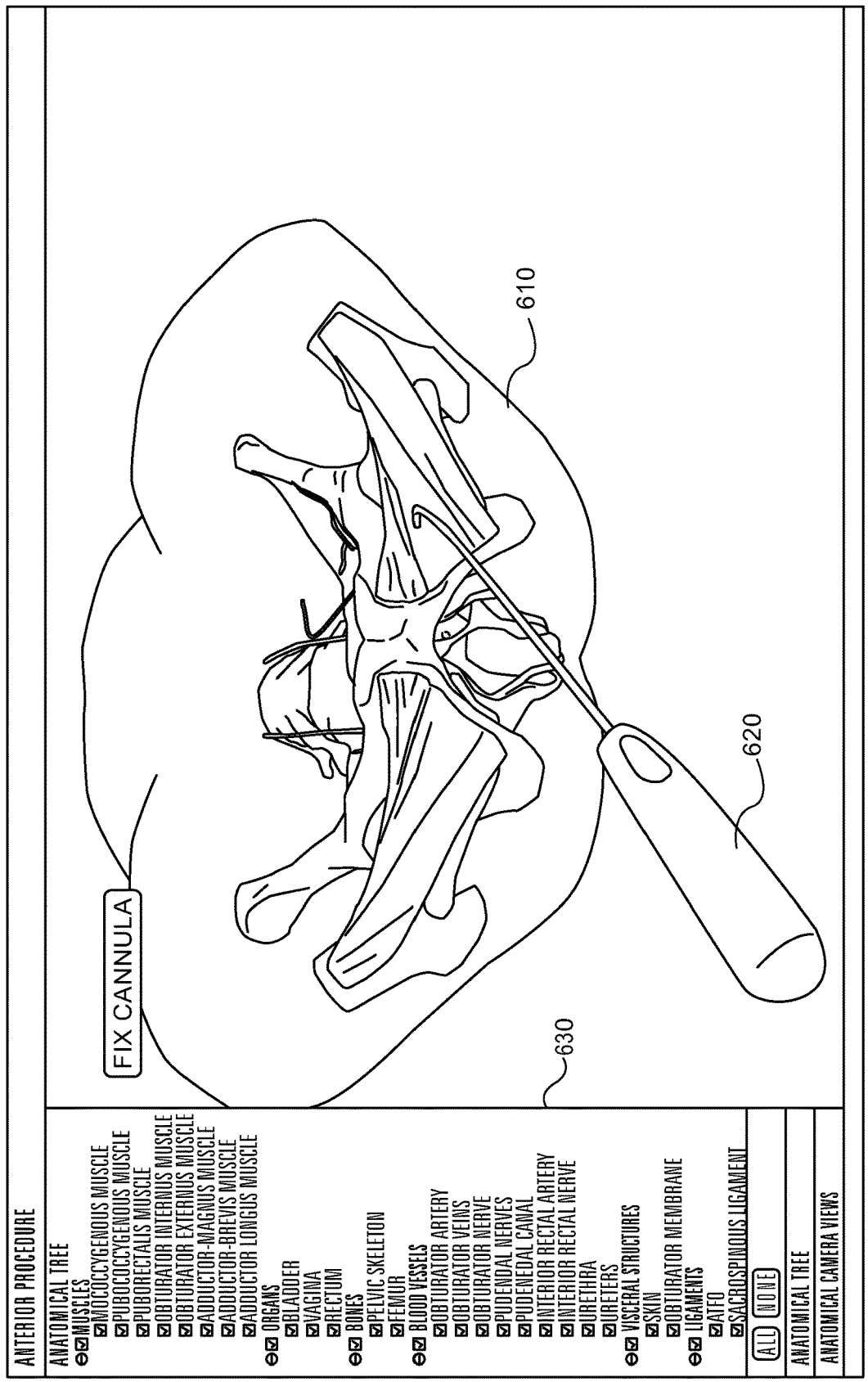

Reference is additionally made to FIG. 6 which shows an exemplary screenshot including simulated, 3D digital models of an anatomical structure and of a medical tool. Using a location parameter related to a location, orientation or position of a medical tool with respect to a location of a physical model, a simulated digital model of a medical tool as shown by 620 may be displayed, with respect to a simulated digital model as shown by 610 where the two models are displayed such that their respective locations, positions or orientations are substantially the same as those of a related actual medical tool and of an actual, physical model. It will be understood that models such as those shown in FIGS. 3, 4, 5 and 6 may be manipulated. For example, the models may be manipulated such that they closely, dynamically and in real-time copy or are otherwise related to the relative positions, locations or other spatial aspects of real, actual entities, e.g., a dummy or mannequin, a medical tool and/or a finger or palm of a trainee. The anatomical tree shown by 630 may be similar to the anatomical tree shown by 530.

As shown by block 245, the method may include manipulating the digital 3D models of the anatomical structure and the finger according to the location and/or orientation of the finger. For example, any movement, position or change of location of the physician's finger or hand may be closely duplicated, imitated, replicated, repeated, copied or reproduced by the 3D digital model of the hand or finger. The 3D model of the mannequin may be manipulated according to any movement, position or change of location of the physician's finger or hand. For example, the 3D model of the mannequin may be manipulated such that it imitates or reproduces the response or interaction of a real subject, patient or physical mannequin with a physician's finger or hand.

As shown by block 250, the method may include attaching a transmitter to an element, providing a digital 3D model of the element and receiving a location and/or an orientation parameter related to a location and/or an orientation of the element, the parameter related to a location and/or orientation of the physical model. For example, a transmitter may be attached to a physical support grid or mesh inserted and/or placed during a pelvic floor reconstruction interventional procedure. Using techniques described herein or any other technique, the location of the mesh may be determined or known. Accordingly, a 3D model of the element may be manipulated to reflect the physical location, position or any other geometrical aspect of the mesh. In some embodiments, a number of transmitters may be attached to an element, e.g., to better determine the element's position. For example, a number of transmitters may be attached to a number of location on an element, e.g., on the edges and center of a mesh. Accordingly, the exact location, position or layout of the mesh may be determined and may be presented by a corresponding 3D model of the mesh.

As shown by block 255, the method may include providing a user with feedback related to a performance of the medical procedure based on a location and/or orientation of at least one of: the finger, physical medical tool and the physical element. For example, presentation unit 125 may present any feedback. For example, an ideal path may be preconfigured and/or provided to controller 131. For example, coordinates of an ideal path for an insertion of a cannula (e.g., as determined by an expert) may be determined and stored, e.g., on data repository 140. Using a sequence of locations of a tool, a finger and/or an element, controller 131 may compare the path of a tool, a finger and/or an element to a preconfigured path. Controller 131 may guide a user. For example, by comparing a path tracked by a user inserting a cannula to a preferred path, controller 131 may determine the user deviates from the preferred path or is moving away from a preferred location and may instruct or help the user to return to, or maintain a preferred path or reach a preferred location. For example, at any point during the simulated procedure controller 131 may provide directions to a user, e.g., "direct cannula left", "move finger upwards", "move guide forward 3 centimeters" etc. Accordingly, embodiments of the invention may enable performing an image-guided, computerized simulation of a procedure.

According to embodiments of the invention, providing of feedback may be performed simultaneously or concurrently with performance of a related simulation of a procedure, or it may be otherwise at the same time. In some embodiments, providing feedback may be synchronized or otherwise coordinated with a progress, state, mode, context or any relevant aspect of a simulated procedure. Feedback may be provided together with the simulated procedure, e.g., while the simulated procedure is in progress. For example, a single display may be used to present feedback and one or more 3D models, e.g., 3D models of a tool, finger and/or element. In some embodiments, a location of a tool, finger or element may be used to control force feedback or other devices. For example, based on a location of a tool (e.g., if the tool is in contact with a tissue or bone) a force feedback control signal may be generated such that a physical tool used by a trainee is to provide the trainee with a proper sensation or feedback.

As shown by block 260, the method may include determining a score related to a performance of the medical procedure and recording the score. For example, by comparing a path tracked by a cannula or catheter inserted by a user performing the simulated procedure to a preferred or predefined track a score may be calculated. For example, the lower the deviation from an ideal or preferred path, the higher the score may be. A time for completing a predefined part of an operation may be preconfigured and the time a user takes to complete such part may be recorded (e.g., controller 131 may start a timer when an element is located in a first location and stop the timer when the element reaches a second location). Accordingly, a score may be calculated based on the time the user required to complete a task. Any other aspects of a simulated procedure may be used in order to calculate or compute a score. For example, a preferred location or placement of an element may be calculated or it may be indicated or dictated by an expert and the scoring may take also into account information about adverse events such as vessel perforation, hitting nerves and amount of blood lost during the operation. By determining a location or placement of an element (e.g., using signals transmitted by one or more transmitters attached to the element and received by a stationary receiver) and comparing the location and placement to the preferred location and placement, a score may be calculated and recorded.

As score may be based on any parameter related to a performance of a procedure. For example, a score may be related to, or based on, a path used to reach a location within an anatomical structure, a time taken to perform a task, a placement of an element and the like. For example, a performance of a procedure by an expert may be recorded and any aspect of a performance of the procedure by a trainee may be compared or otherwise related to the recorded procedure as performed by the expert. Additionally or alternatively, thresholds (e.g., related to time, location etc.) may be configured and a performance of a procedure may be scored by comparing parameters (e.g., a duration) to a threshold. Other parameters or aspects of a score may be, for example, entry into specific areas or missing specific areas. For example, a specific anatomical area, region or organ may be marked as "forbidden" and a presence of a medical tool, element or user's hand or finger in such area, region may be flagged and/or affect a score. In a similar way, a position or orientation of a tool, element, hand or finger, e.g., with respect to a dummy that deviates by more than a predefined threshold or other criteria may affect a score.

Additional reference is made to FIG. 7 which shows an exemplary screenshot including an exemplary presentation of a report 710 including scores according to embodiments of the invention. A score may be presented to a user and may be saved. Accordingly, a progress of a user may be monitored and/or evaluated, e.g., by observing a number of scores calculated over a number of performances of a procedure. As shown, a report may include scores for finger anatomical recognition and for using a guide. For example and as shown, scores related to finger anatomical recognition may be coverage percentage for left (and right) portion of rectovaginal space and scores related to using a guide may be posterior left (and right) route anomalies, maximal anomaly from ideal posterior left (and right) route. Other scores may be based on, or related to, for example, a percentage of organs related to the anterior procedure that were palpated correctly, a coverage percentage of left or right Arcus Tendentious Fascia Pelvis (ATFP), a palpation coverage percentage of the total paravesical space, a number of times a guide deviated from an ideal (e.g., predetermined or preconfigured) route, a distance between 2 or more placed or inserted elements (e.g., cannulas).

Feedback provided may comprise alerts, alarms or any other indication or information. For example, an alarm may be triggered if a user leads a cannula too close to a blood vessel. For example, a 3D model of mannequin 170 may include any information or data including location of blood vessels. Accordingly, provided with any relevant anatomical information and with any parameter related to a location of a tool, finger or element, controller 131 may determine that an alarm is to be triggered.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of simulating a medical procedure, the method comprising:
   installing a physical model of an anatomical structure in a physical mannequin;
   automatically synchronizing a digital 3D model of: the physical mannequin, a part of the physical mannequin, or the physical model of the anatomical structure, with the physical model of the anatomical structure installed in the physical mannequin based on a signal received from a component installed in the physical model of the anatomical structure, said synchronizing comprising generating the digital 3D model based at least on the signal received;
   displaying a digital 3D model of a physical medical tool or a digital 3D model of a finger with the synchronized digital 3D model of: the physical mannequin, the part of the physical mannequin, or the physical model of the anatomical structure, on a display attached to a computing device;
   placing a stationary transceiver at a known distance from: the physical mannequin, the part of the physical mannequin, or the physical model of the anatomical structure, and in a known orientation with respect to: the physical mannequin, the part of the physical mannequin, or the physical model of the anatomical structure;
   attaching a mobile transceiver to a physical medical tool or to a finger;
   analyzing signals received at one of the stationary transceiver and the mobile transceiver from the other of the stationary transceiver and the mobile transceiver;
   determining a location of the physical medical tool or the finger relative to a location of: the physical mannequin, the part of the physical mannequin, or the physical model of the anatomical structure, based on the analyzed signals and the known distance and orientation of the stationary transceiver with respect to: the physical mannequin, the part of the physical mannequin, or the physical model of the anatomical structure;
   manipulating the synchronized digital 3D model of: the physical mannequin, the part of the physical mannequin, or the physical model of the anatomical structure, and the digital 3D model of the physical medical tool or the digital 3D model of the finger, according to the determined location of the physical medical tool or the finger; and
   after the manipulating, updating the display of the synchronized digital 3D model based on the manipulating.

2. The method of claim 1, comprising:
   dynamically updating, in real-time, the display of the synchronized digital 3D model of: the physical mannequin, the part of the physical mannequin, or the physical model of the anatomical structure, and the digital 3D model of the medical tool or the digital 3D model of the finger, to reflect the location and position of: the physical mannequin, the part of the physical mannequin, or the physical model of the anatomical structure, and the medical tool or the finger.

3. The method of claim 1, comprising:
   determining, based on the analyzed signals, an orientation of the physical medical tool or the finger; and
   displaying the synchronized digital 3D model of: the physical mannequin, the part of the physical mannequin, or the physical model of the anatomical structure, and the digital 3D model of the medical tool or the digital 3D model of the finger, according to the orientation of the physical medical tool or the finger.

4. The method of claim 1, wherein simulating the medical procedure further comprises a placement of an element within: the physical mannequin, the part of the physical mannequin, or the physical model of the anatomical structure.

5. The method of claim 4, wherein the medical procedure is a pelvic floor reconstruction interventional procedure, and wherein the element is a mechanical support or bridging material.

6. The method of claim 1, wherein simulating the medical procedure comprises providing a user with feedback related to a performance of the medical procedure.

7. The method of claim 1, comprising storing, in a database, a recording of the simulated medical procedure.

8. The method of claim 4, comprising:
   displaying a digital 3D model of the element on the display;
   analyzing signals received from the stationary transceiver placed at a distance from: the physical mannequin, the part of the physical mannequin, or the physical model of the anatomical structure, and from a transceiver attached to the element;
   determining a location of the element based on the analyzed signals; and
   manipulating the digital 3D model of the element according to the location of the element.

9. The method of claim 1, comprising determining a score related to a performance of the medical procedure based on at least the determined location of the physical model of the medical tool or of the finger.

10. An article comprising a non-transitory computer-storage medium having stored thereon instructions executed by a processor at a processing platform configured for receiving signals received at one of a stationary transceiver placed at a known distance from: a physical mannequin, a part of the physical mannequin, or a physical model of an anatomical structure installed in the physical mannequin, and in a known orientation with respect to: the physical mannequin, the part of the physical mannequin, or the physical model of the anatomical structure; and a mobile transceiver attached to a physical medical tool or a finger, the signals having been transmitted by the other of the stationary transceiver and the mobile transceiver, the instructions when executed by the processor resulting in:

automatically synchronizing a digital 3D model of: the physical mannequin, the part of the physical mannequin, or the physical model of the anatomical structure installed in the physical mannequin based on a signal received from a component installed in the physical model of the anatomical structure, said synchronizing comprising generating the digital 3D model based at least on the signal received;

displaying a digital 3D model of the physical medical tool or of a finger with the synchronized digital 3D model of: the physical mannequin, the part of the physical mannequin, or the physical model of the anatomical structure, on a display attached to a computing device;

analyzing the signals received at one of a stationary transceiver placed at a distance from: the physical mannequin, the part of the physical mannequin, or the physical model of the anatomical structure, and a mobile transceiver attached to a physical medical tool or a finger from the other of the stationary transceiver placed at a distance from: the physical mannequin, the part of the physical mannequin, or the physical model of the anatomical structure, and the mobile transceiver attached to the physical medical tool or finger;

determining a location of the physical medical tool or of the finger relative to a location of: the physical mannequin, the part of the physical mannequin, or the physical model of the anatomical structure, based on the analyzed signals and the known distance and orientation of the stationary transceiver with respect to: the physical mannequin, the part of the physical mannequin, or the physical model of the anatomical structure;

manipulating the synchronized digital 3D model of: the physical mannequin, the part of the physical mannequin, or the physical model of the anatomical structure, and the digital 3D model of the physical medical tool or the digital 3D model of the finger, according to the determined location of the physical medical tool or of the finger; and after the manipulating, updating the display of the synchronized digital 3D model based on the manipulating.

11. The article of claim 10, wherein the instructions when executed further result in:

dynamically updating, in real-time, the display of the synchronized digital 3D model of: the physical mannequin, the part of the physical mannequin, or the physical model of the anatomical structure, and the digital 3D model of the medical tool or the digital 3D model of the finger, to reflect the location and position of: the physical mannequin, the part of the physical mannequin, or the physical model of the anatomical structure, and the medical tool or the finger.

12. The article of claim 10, wherein the instructions when executed further result in:

determining, based on the analyzed signals, an orientation of the medical tool or of the finger; and displaying the synchronized digital 3D model of: the physical mannequin, the part of the physical mannequin, or the physical model of the anatomical structure; and the digital 3D model of the medical tool or the digital 3D model of the finger according to the orientation of the physical medical tool or the finger.

13. The article of claim 10, wherein the instructions when executed further result in:

analyzing signals received from at least one transceiver attached to an element, wherein the signals are indicative of placement of the element in: the physical mannequin, the part of the physical mannequin, or the physical model of the anatomical structure;

displaying a digital 3D model of the element on the display;

determining a location of the element in: the physical mannequin, the part of the physical mannequin, or the physical model of the anatomical structure, based on the analyzed signals; and manipulating the digital 3D model of the element according to the location of the element.

14. The article of claim 10, wherein the instructions when executed further result in providing a user with feedback related to a performance of the medical procedure.

15. A method of simulating a medical procedure, the method comprising:

installing a physical model of an anatomical structure in a physical mannequin;

automatically synchronizing a digital 3D model of: the physical mannequin, a part of the physical mannequin, or the physical model of the anatomical structure, based on a signal received from a component installed in a physical model of the anatomical structure, displaying a digital 3D model of a finger of a user or a digital 3D model of a physical medical tool with the synchronized digital 3D model of: the physical mannequin, the part of the physical mannequin, or the physical model of the anatomical structure, on a display attached to a computing device;

analyzing one or both of:

signals received at a stationary transceiver spaced at a known distance from: the physical mannequin, the part of the physical mannequin, or the physical model of the anatomical structure, and in a known orientation with respect to: the physical mannequin, the part of the physical mannequin, or the physical model of the anatomical structure, from a mobile transceiver associated with the finger of the user or with the physical medical tool; and signals received at a mobile transceiver associated with the finger of the user or with the physical medical tool from a transceiver spaced at a known distance from: the physical mannequin, the part of the physical mannequin, or the physical model of the anatomical structure, and in a known orientation with respect to: the physical mannequin, the part of the physical mannequin, or the physical model of the anatomical structure;

determining a location of the finger of the user or the physical medical tool relative to a location of: the physical mannequin, the part of the physical mannequin, or the physical model of the anatomical structure, based on the one or both analyzed signals and the known distance and orientation of the stationary transceiver with respect to: the physical mannequin, the part of the physical mannequin, or the physical model of the anatomical structure;

manipulating the synchronized digital 3D model of: the physical mannequin, the part of the physical mannequin, or the physical model of the anatomical structure, and the digital 3D model of the finger of the user or the digital 3D model of the physical medical tool according to the determined location of the finger of the user or the physical medical tool; and after the manipulating, updating the display of the synchronized digital 3D model based on the manipulating.

16. The method of claim 15, comprising:

dynamically updating, in real-time, the display of: the synchronized digital 3D model of the physical mannequin, the part of the physical mannequin, or the anatomical structure, and the 3D model of the finger of the user or the digital 3D model of the physical medical tool to reflect the location and position of: the physical mannequin, the part of the physical mannequin, or the physical model of the anatomical structure, and the finger of the user or the digital 3D model of the physical medical tool.

17. The method of claim 15, wherein the medical procedure is a pelvic examination.

* * * * *